US008829859B2

(12) United States Patent
Chen

(10) Patent No.: US 8,829,859 B2
(45) Date of Patent: Sep. 9, 2014

(54) CHARGER AUTOMATICALLY TRACKING AN OPTIMAL CHARGING FREQUENCY FOR SINUSOIDAL WAVE BATTERIES

(75) Inventor: Liang-Rui Chen, Changhua (TW)

(73) Assignee: National Changhua University of Education, Changhua (TW)

( * ) Notice: Subject to any disclaimer, the term of this patent is extended or adjusted under 35 U.S.C. 154(b) by 586 days.

(21) Appl. No.: 13/090,806

(22) Filed: Apr. 20, 2011

(65) Prior Publication Data
US 2012/0268060 A1    Oct. 25, 2012

(30) Foreign Application Priority Data
Nov. 23, 2010    (TW) .................................. 99140339

(51) Int. Cl.
*H02J 7/04*    (2006.01)
*H02J 7/00*    (2006.01)
(52) U.S. Cl.
CPC *H02J 7/04* (2013.01); *H02J 7/0093* (2013.01)
USPC .......................................... 320/142; 320/162

(58) Field of Classification Search
CPC .......... H02J 7/0093; H02J 7/008; H02J 7/042
USPC ................... 320/107, 142, 143, 162
See application file for complete search history.

(56) References Cited

U.S. PATENT DOCUMENTS

| 5,382,923 A * | 1/1995 | Shimada et al. ................... 331/8 |
| 6,927,553 B2 * | 8/2005 | Chen ............................. 320/124 |
| 2004/0169563 A1 * | 9/2004 | Abbasi et al. ................. 331/160 |

* cited by examiner

*Primary Examiner* — Edward H Tso
*Assistant Examiner* — Aaron Piggush
(74) *Attorney, Agent, or Firm* — Jackson IPG PLLC

(57) ABSTRACT

A device and a method automatically trace and fix a resonance frequency of the batteries for offering an optimal charging frequency to the batteries. The device and method utilize a resonance frequency $f_r$ that charges batteries with a sinusoidal wave, automatic tracing function, and a fixed current. While the resonance frequency $f_r$ is adopted in a charging device and served as the optimum charging frequency, the using life of the batteries could be extended.

13 Claims, 5 Drawing Sheets

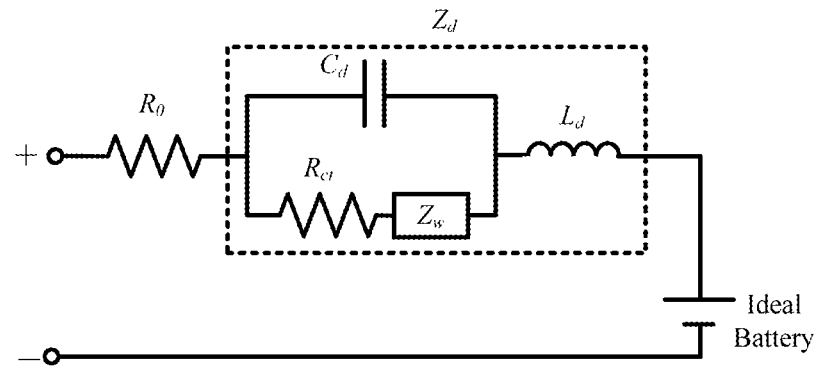
Fig.1-A
PRIOR ART
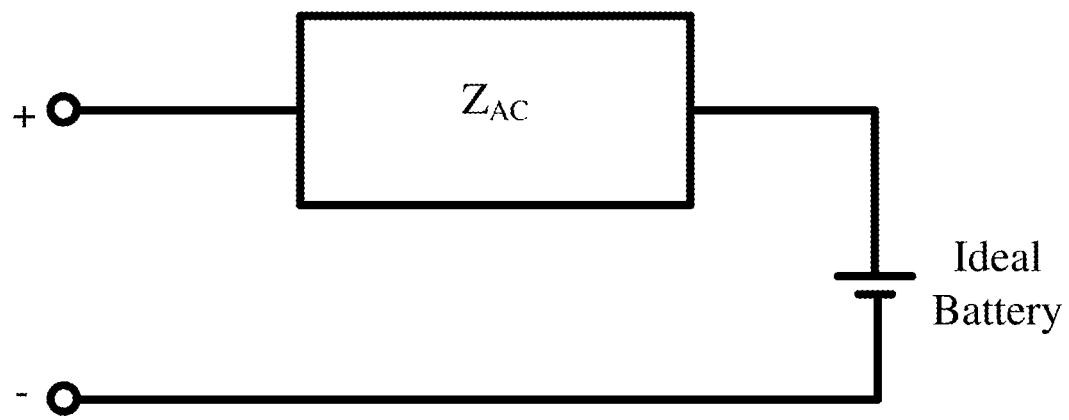
Fig.1-B
PRIOR ART

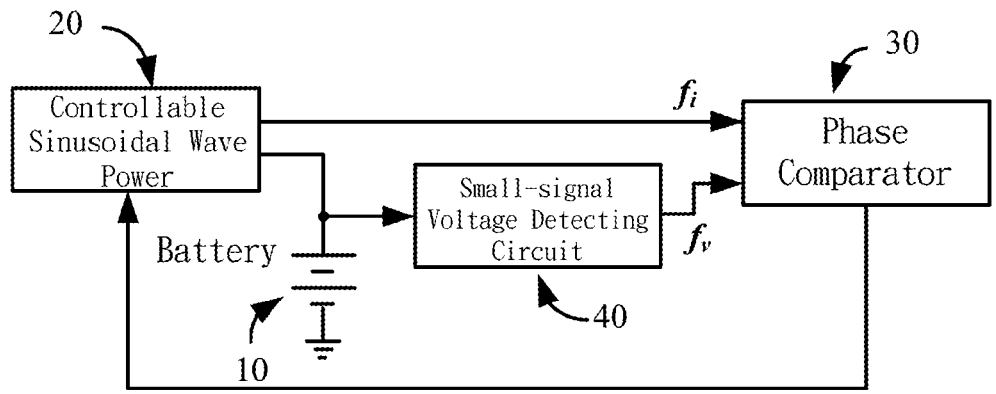
Fig.2-A
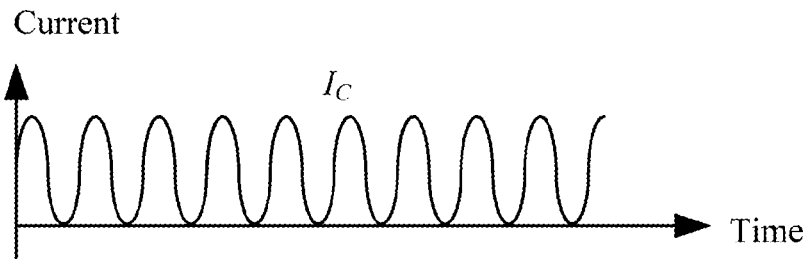
Fig.2-B
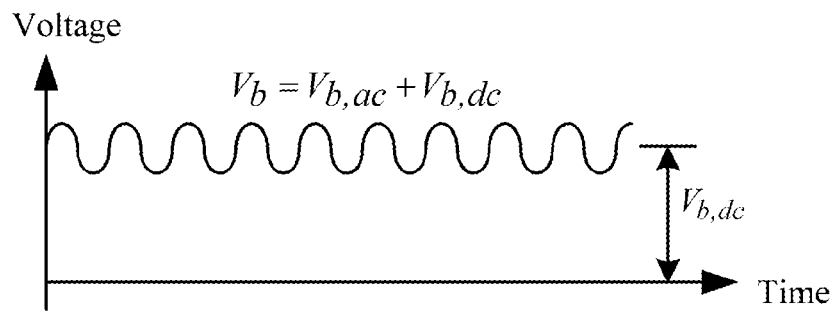
Fig.2-C
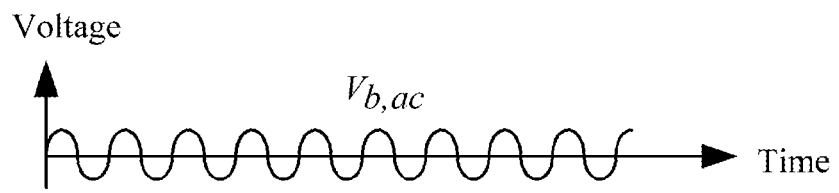
Fig.2-D

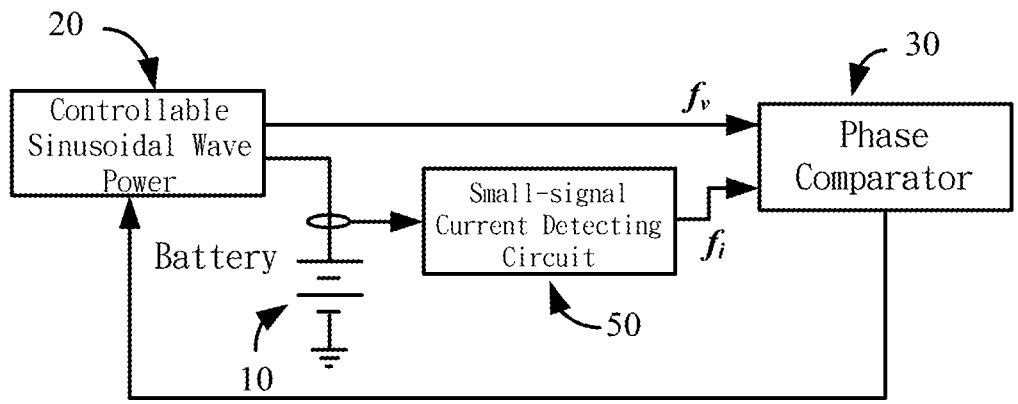
Fig.3-A
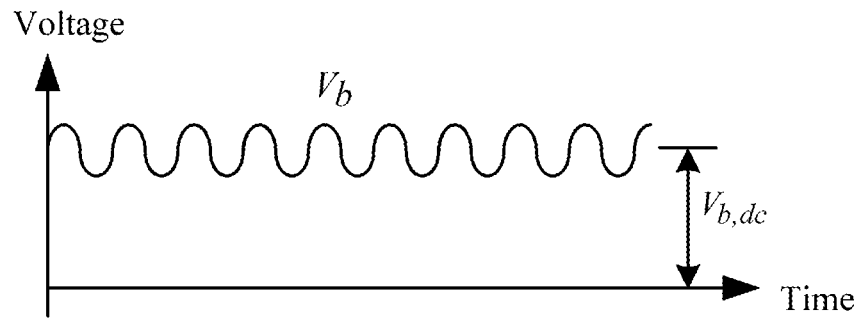
Fig.3-B
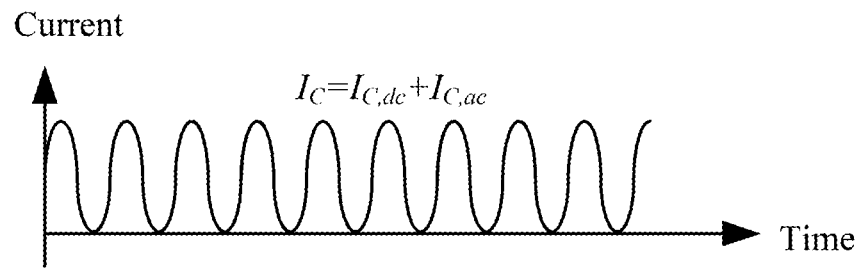
Fig.3-C
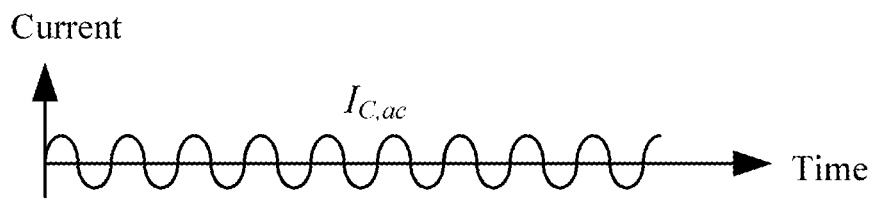
Fig.3-D

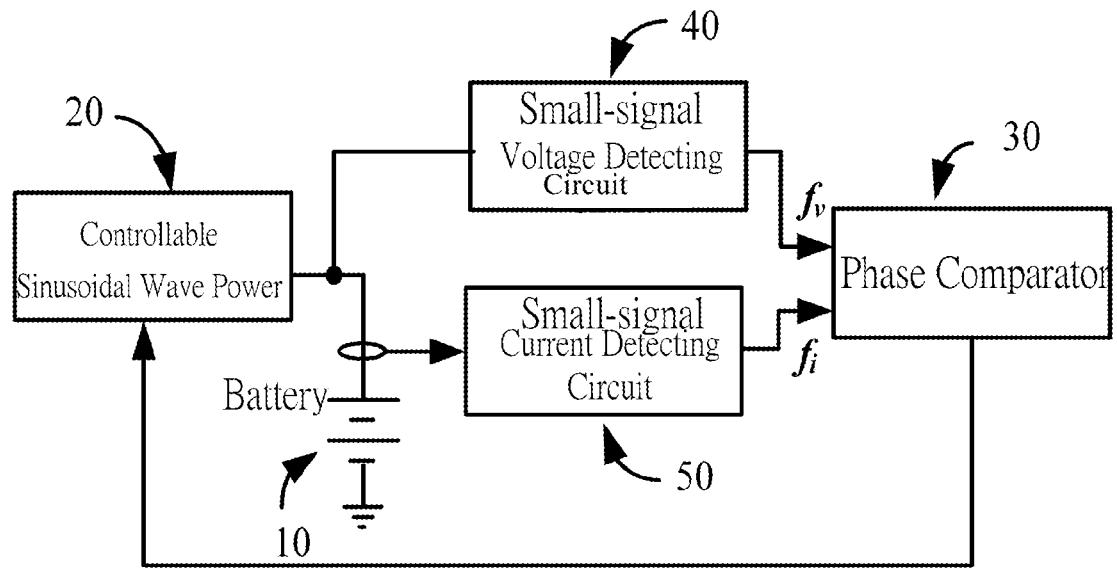
Fig.4-A
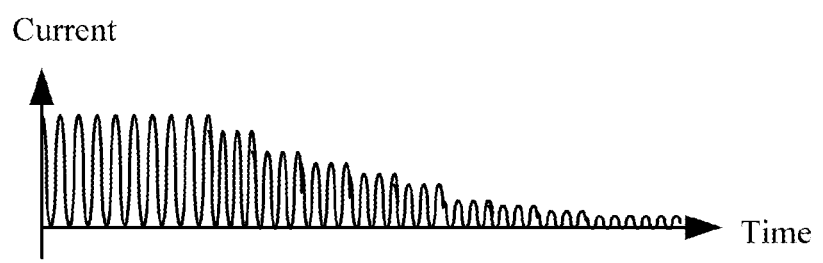
Fig.4-B
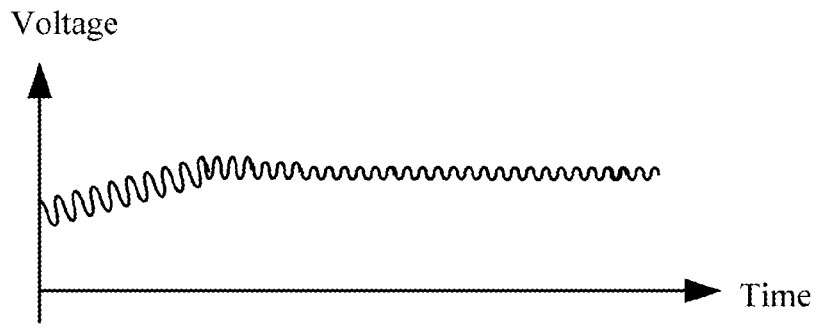
Fig.4-C

CHARGER AUTOMATICALLY TRACKING AN OPTIMAL CHARGING FREQUENCY FOR SINUSOIDAL WAVE BATTERIES

BACKGROUND OF THE INVENTION

1. Field of the Invention

The present invention relates to a device and a method for charging batteries with a sinusoidal wave, particularly to a device and a method that automatically traces and fixes a resonance frequency of the batteries for offering an optimal charging frequency to the batteries.

2. Description of the Related Art

The great progress and speedy development of the electronic techniques have popularized the portable electronic devices such as cellphones, laptops, and MP3s, which adopt a secondary battery to serve the main power source. While the recyclable energy and the motor-driven vehicles are greatly developed, energy storage systems for batteries become essential subsystems. Obviously, techniques for charging batteries grow to be important. Common techniques for charging batteries such as the Constant Trickle Current Charge (CTC), the Constant Current (CC), and the Constant Current and Constant Voltage (CC-CV) are generally utilized (REFERENCE 1). Wherein, the CC-CV is the most popular means for charging batteries. However, the CC-CV provides unsatisfactory charging efficacy. Thereby, charging means such as the artificial neural network, the genetic algorithm, the ant algorithm, and the grey prediction are applied for enhancing the charging efficacy (REFERENCES 2-6). However, afore charging means actually consist of complicated circuits and the costs thereof are also high. Accordingly, another charging means that applies the phase-locked loop technique is adopted for speedily charging batteries with a low circuit cost (REFERENCES 7 to 10). The pulse wave charging means is also commonly applied for charging batteries today. Such charging means allows ions in electrolyte of the batteries to be spread evenly and postpones the polarization of the batteries so as to accelerate the charging speed and enhance the using life (REFERENCE 11). In fact, a charging frequency in the pulse wave charging system determines the charging speed and the charging state. A conventional way to find out the optimal charging frequency utilizes the empirical approach or the trial and error method. However, these means do not discuss how to determine the optimal charging frequency (REFERENCES 12 to 16). In order to modify the conventional charging means with an objective manner, the alternate current property of batteries must be acquainted. FIG. 1-A shows an AC Impedance Model that comprises a Charge Transfer Resistance $R_{ct}$, a Warburg Impedance $z_w$, an electrode parallelly connected to a Capacitance $C_d$ in an electrolyte, an Ohmic Resistance $R_o$ serially connected to an Electrode Inductance $L_d$, and an Ideal Battery (REFERENCES 17 to 19). Wherein, the battery is turned to an equivalent model, and circuits thereof adopt one impedance $Z_{battery}$ that is serially connected to one Ideal Battery. FIG. 1-B shows that the battery equivalent model is analyzed through a circuit means. Namely, two ends of the battery are respectively added with a variable frequency. While the frequency is changed, the impedance of the battery is varied accordingly. Whereby, a loss state of the battery capacity could be controlled by the frequency of the power. That is to say, if an optimum energy transferring efficiency is to be served to the battery in time of charging, a minimum impedance of the battery has to be adopted. That is because under such frequency, the battery temperature does not raise largely, and the using life of the battery could be concurrently prolonged.

Accordingly, the present invention utilizes a resonance frequency $f_r$ that charges batteries with a sinusoidal wave, automatic tracing function, and a fixed current. While the resonance frequency $f_r$ is adopted in a charging device and served as the optimum charging frequency, the using life of the batteries could be extended.

SUMMARY OF THE INVENTION

A method for charging batteries comprises a Sinusoidal Wave that is formed by at least either a charging voltage wave or a charging current wave at the same time. A method for charging batteries comprises a Sinusoidal Wave with a DC offset formed by at least either a charging voltage wave or a charging current wave at the same time. A charging frequency is changed according to a charging state of the batteries. The charging frequency adopts a resonance frequency of an AC Impedance of the batteries. The charging frequency adopts a frequency suited to a lowest AC Impedance of the batteries.

A device for charging batteries at least comprises a controllable sinusoidal power for outputting sinusoidal wave voltages or sinusoidal wave currents of different frequencies so as to charge the batteries.

A device for charging batteries at least comprises a phase comparator for determining a charging frequency of the batteries.

A device for charging batteries at least comprises a controllable sinusoidal wave power, a small-signal voltage detecting circuit, and a phase comparator. Wherein, the controllable sinusoidal wave power receives an output phase contrast signal of the phase comparator for changing an output frequency of the sinusoidal wave power until the output phase contrast signal of the phase comparator equals to zero or a determined value. The small-signal voltage detecting circuit measures a charging voltage of the batteries and filters out a DC part thereof for attaining a small-signal voltage signal. Concurrently, the small-signal voltage signal is amplified and transmitted to the phase comparator. The phase comparator receives a current phase signal from the controllable sinusoidal wave power and a voltage phase signal from the small-signal voltage detecting circuit for comparing a phase contrast therebetween so as to transmit a comparing result to the controllable sinusoidal wave power. The controllable sinusoidal wave power at least comprises a voltage-controlled oscillator and a voltage-to-current converter for outputting sinusoidal wave currents of different frequencies. The small-signal voltage detecting circuit at least comprises a high pass filter and an amplifier.

A device for charging batteries at least comprises a controllable sinusoidal wave power, a small-signal current detecting circuit, and a phase comparator. Wherein, the controllable sinusoidal wave power receives an output phase contrast signal of the phase comparator for changing an output frequency of the sinusoidal wave power until the output phase contrast signal of the phase comparator equals to zero. The small-signal current detecting circuit measures a charging current of the batteries and filters out a DC part thereof for attaining a small-signal current signal. Concurrently, the small-signal current signal is amplified and transmitted to the phase comparator. The phase comparator receives a voltage phase signal from the controllable sinusoidal wave power and a voltage phase signal from the small-signal current detecting circuit for comparing a phase contrast therebetween so as to transmit a comparing result to the controllable sinusoidal wave power. The controllable sinusoidal wave power at least comprises a voltage-controlled oscillator for outputting sinusoidal wave currents of different frequencies. The small-signal current detecting circuit at least comprises a high pass filter and an amplifier.

A device for charging batteries comprises a controllable sinusoidal wave power, a small-signal current detecting circuit, a small-signal voltage detecting circuit, and a phase comparator. Wherein, the controllable sinusoidal wave power receives an output phase contrast signal of the phase comparator for changing an output frequency of the sinusoidal wave power until the output phase contrast signal of the phase comparator equals to zero. The small-signal current detecting circuit measures a charging current of the batteries and filters out a DC part thereof for attaining a small-signal current signal. Concurrently, the small-signal current signal is amplified and transmitted to the phase comparator. The small-signal voltage detecting circuit measures a charging voltage of the batteries and filters out a DC part thereof for attaining a small-signal voltage signal. Concurrently, the small-signal voltage signal is amplified and transmitted to the phase comparator. The phase comparator receives a voltage phase signal from the small-signal voltage detecting circuit and a current phase signal from the small-signal current detecting circuit for comparing a phase contrast therebetween so as to transmit a comparing result to the controllable sinusoidal wave power. The controllable sinusoidal wave power at least comprises a voltage-controlled oscillator for outputting sinusoidal wave voltages and currents of different frequencies. The controllable sinusoidal wave power at least comprises a low pass filter, a voltage-controlled oscillator, an amplifier, a clamp circuit, and a voltage-to-current converter for outputting sinusoidal wave voltages and currents of different frequencies.

BRIEF DESCRIPTION OF THE DRAWINGS

FIG. 1-A is a model showing an AC Impedance of a battery;

FIG. 1-B is a schematic view showing the AC Impedance Model of the battery;

FIG. 2-A is a system block view and a wave of a first preferred embodiment of the present invention;

FIG. 2-B is a schematic view showing a current wave of the battery of the first preferred embodiment of the present invention in time of charging;

FIG. 2-C is a schematic view showing a voltage wave of the battery of the first preferred embodiment;

FIG. 2-D is a schematic view showing a small-signal voltage signal wave of the battery of the first preferred embodiment;

FIG. 3-A is a system block view and a wave of a second preferred embodiment of the present invention;

FIG. 3-B is a schematic view showing a current wave of the battery of the second preferred embodiment of the present invention in time of charging;

FIG. 3-C is a schematic view showing a voltage wave of the battery of the second preferred embodiment;

FIG. 3-D is a schematic view showing a small-signal voltage signal wave of the battery of the second preferred embodiment;

FIG. 4-A is a system block view and a wave of a third preferred embodiment of the present invention;

FIG. 4-B is a schematic view showing a current wave of the battery of the third preferred embodiment of the present invention in time of charging;

FIG. 4-C is a schematic view showing a voltage wave of the battery of the third preferred embodiment in time of charging;

DETAILED DESCRIPTION OF THE PREFERRED EMBODIMENTS

Figure 5:
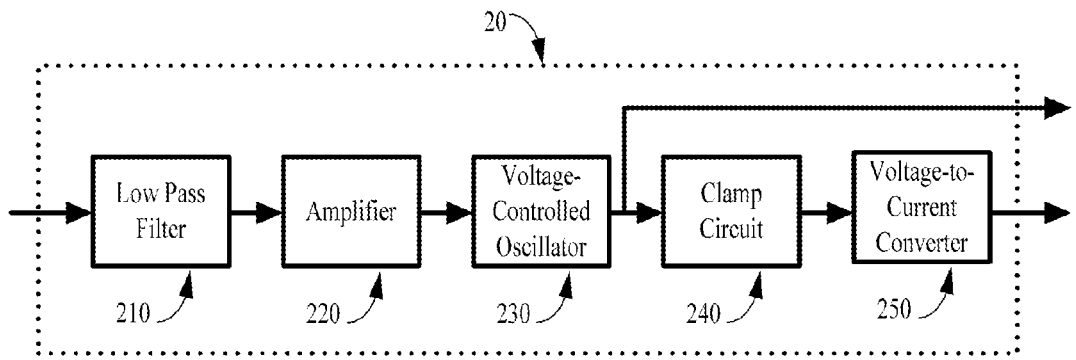
FIG. 5 is a block view showing a controllable sinusoidal wave power of an output voltage sinusoidal wave.

FIG. 2-A shows a system block view of a first preferred embodiment of the present invention. A controllable sinusoidal wave power 20, a small-signal voltage detecting circuit 40, a phase comparator 30, and a battery 10 are shown. The controllable sinusoidal wave power 20 outputs the sinusoidal wave power of different frequencies. The small-signal voltage detecting circuit 40 measures a charging voltage $v_b = v_{b,dc} + v_{b,ac}$ of the battery and filters out a DC part $v_{b,dc}$ thereof for attaining a small-signal voltage signal $v_{b,ac}$. The phase comparator 30 compares a phase contrast between the current and the voltage. The operational principle is as follows. First, the controllable sinusoidal wave power 20 generates a sinusoidal wave current $I_c$ for charging the battery. After that, the small-signal voltage detecting circuit 40 measures a voltage phase signal of the battery, which is further transmitted to the phase comparator 30. Accordingly, the phase comparator 30 receives a current phase signal from the controllable sinusoidal wave power 20 for attaining the phase contrast between the voltage and the current of the battery 10. Whereby, the controllable sinusoidal wave power 20 receives an accordant phase contrast signal for changing a charging frequency thereof correspondingly. Namely, the phase contrast between the voltage and the current of the battery 10 being zero allows an operating frequency of the circuit constantly to be suited to a resonance frequency $f_r$ until the battery is fully charged. FIGS. 2-B, 2-C, and 2-D show the waves. The controllable sinusoidal wave power 20 generates a sinusoidal wave current $I_c$ for charging the battery. FIG. 2-B shows that the voltage of the battery consists of an obvious DC voltage $v_{b,dc}$, which approximately equals to an open circuit voltage of the battery. The voltage of the battery further consists of a small-signal AC voltage $v_{b,ac}$, which results from the sinusoidal wave passing through an AC impedance of the battery as shown in FIG. 2-C. The small-signal AC voltage $v_{b,ac}$ measured by the small-signal voltage detecting circuit 40 is the voltage phase signal as shown in FIG. 2-D.

FIG. 3-A shows a system block view of a second preferred embodiment of the present invention. A controllable sinusoidal wave power 20, a small-signal current detecting circuit 50, a phase comparator 30, and a battery 10 are shown. The controllable sinusoidal wave power 20 outputs sinusoidal wave power of different frequencies. The small-signal current detecting circuit 50 measures a charging current $I_c = I_{C,dc} + I_{C,ac}$ of the battery and filters out a DC part $I_{C,dc}$ thereof for attaining a small-signal current signal $I_{C,ac}$. The phase comparator 30 compares a phase contrast between the current and the voltage. The operational principle is as follows. First, the controllable sinusoidal wave power 20 generates a sinusoidal wave voltage $v_b$ for charging the battery. Thereby, the small-signal current detecting circuit 50 measures a current phase signal of the battery, which is further transmitted to the phase comparator 30. Accordingly, the phase comparator 30 receives a voltage phase signal from the controllable sinusoidal wave power 20 for attaining the phase contrast between the voltage and the current of the battery 10. Whereby, the controllable sinusoidal wave power 20 receives an accordant phase contrast signal for changing a charging frequency thereof correspondingly. Namely, the phase contrast between the voltage and the current of the battery 10 being zero allows an operating frequency of the circuit constantly to be suited to a resonance frequency $f_r$ until the battery is fully charged. FIGS. 3-B, 3-C, and 3-D show the waves. The controllable sinusoidal wave power 20 generates a sinusoidal wave current $v_b$ consisting of an obvious DC offset for charging the battery. FIG. 3-B shows that a sinusoidal wave voltage $v_b$, whose DC voltage $v_{b,dc}$ approximately equals to an open circuit voltage of the battery. Additionally, a peak value of the sinusoidal wave voltage equals to an end-of-charge voltage of the battery. The charging current of the battery is $I_C = I_{C,dc} + I_{C,ac}$. FIG. 3-C shows that the charging current of the battery further consists of a DC current $I_{C,dc}$ and a small-signal current signal $I_{C,ac}$. Whereby, the small-signal current wave of the battery measured by the small-signal current detecting circuit 50 is a current phase signal as shown in FIG. 3-D.

FIG. 4-A shows a system block view of a third preferred embodiment of the present invention. A controllable sinusoidal wave power 20, a small-signal voltage detecting circuit 40, a small-signal current detecting circuit 50, a phase comparator 30, and a battery 10 are shown. The controllable sinusoidal wave power 20 outputs sinusoidal wave power of different frequencies. The small-signal voltage detecting circuit 40 measures a charging voltage $v_b$ of the battery and filters out a DC part $v_{b,dc}$ thereof for attaining a small-signal voltage signal $v_{b,ac}$. The small-signal current detecting circuit 50 measures a charging current $I_c$ of the battery and filters out a DC part $I_{C,dc}$ thereof for attaining a small-signal current signal $I_{C,ac}$. The phase comparator 30 compares a phase contrast between the current and the voltage. The operational principle is as follows. First, the controllable sinusoidal wave power 20 generates a sinusoidal wave current for charging the battery. Accordingly, the small-signal voltage detecting circuit 40 measures a voltage phase signal of the battery 10, and the small-signal current detecting circuit 50 measures a current phase signal of the battery 10. Herein, the phase comparator 30 receives a voltage phase signal from the small-signal voltage detecting circuit 40 and a current phase signal from the small-signal current detecting circuit 50 for attaining the phase contrast between the voltage and the current of the battery 10. Further, the controllable sinusoidal wave power 20 receives an accordant phase contrast signal for changing a charging frequency thereof correspondingly. Namely, the phase contrast between the voltage and the current of the battery 10 being zero allows an operating frequency of the circuit constantly to be suited to a resonance frequency $f_r$. When the voltage of the battery reaches the end-of-charge voltage, the controllable sinusoidal wave power 20 generates a sinusoidal wave voltage for charging the battery. Accordingly, the small-signal voltage detecting circuit 40 measures a voltage phase signal of the battery 10, and the small-signal current detecting circuit 50 measures a current phase signal of the battery 10. Thereby, the phase comparator 30 receives the accordant phase signals for attaining the phase contrast between the voltage and the current of the battery 10. Whereby, the controllable sinusoidal wave power 20 receives the accordant phase contrast signal for changing the charging frequency thereof correspondingly. Namely, the phase contrast between the voltage and the current of the battery 10 being zero allows an operating frequency of the circuit constantly to be suited to a resonance frequency $f_r$ until the battery is fully charged. FIGS. 4-B and 4-C show the charging voltage and the charging current of the third preferred embodiment. Wherein, the battery is firstly charged by the sinusoidal wave current, but when the close circuit voltage of the battery reaches the end-of-charge voltage, the battery is thence charged by the sinusoidal wave voltage.

In the first preferred embodiment as shown in FIG. 2-A, the controllable sinusoidal wave power alternatively comprises elements shown in FIG. 5 that a low pass filter 210, an amplifier 220, a voltage-controlled oscillator (VCO) 230, a clamp circuit 240, and a voltage-to-current converter 250 are included. First, the low pass filter 210 receives the phase contrast signal from the phase comparator 30 and filters out the phase contrast signal for attaining a DC voltage, which is thence transmitted to the amplifier 220 and amplified for being further transmitted to the voltage-controlled oscillator 230. Whereby, the voltage-controlled oscillator 230 changes the output frequency according to the DC voltage. Further, the clamp circuit 240 adjusts the DC level voltage and transmits the same to the voltage-to-current converter 250. Accordingly, the voltage-to-current converter 250 outputs a sinusoidal wave current for charging the battery.

Figure 6:
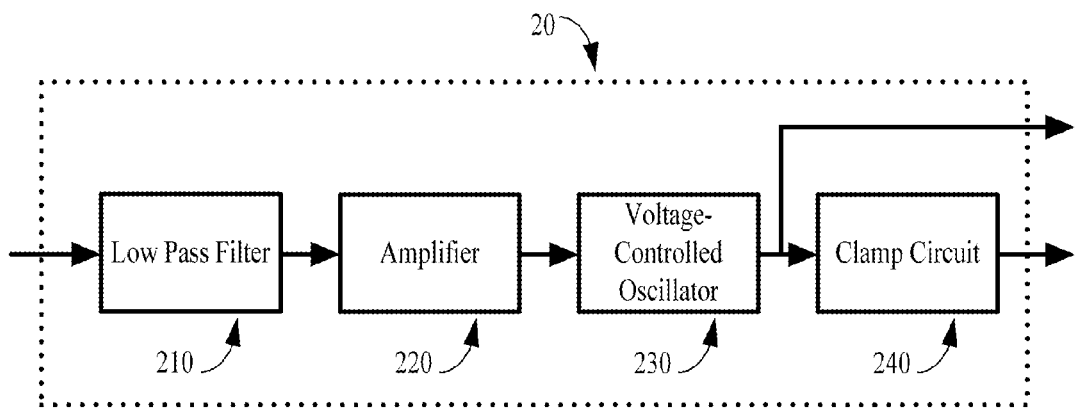
FIG. 6 is a block view showing a controllable sinusoidal wave power of an output current sinusoidal wave.

In the second preferred embodiment as shown in FIG. 3-A, the controllable sinusoidal wave power alternatively comprises elements shown in FIG. 6 that a low pass filter 210, an amplifier 220, a voltage-controlled oscillator (VCO) 230, and a clamp circuit 240 are included. First, the low pass filter 210 receives the phase contrast signal from the phase comparator 30 and filters out the phase contrast signal for attaining a DC voltage, which is thence transmitted to the amplifier 220 and amplified for being further transmitted to the voltage-controlled oscillator 230. Whereby, the voltage-controlled oscillator 230 changes the output frequency according to the DC voltage. Accordingly, the clamp circuit 240 adjusts the DC level voltage for outputting a sinusoidal wave voltage so as to charge the battery.

Figure 7:
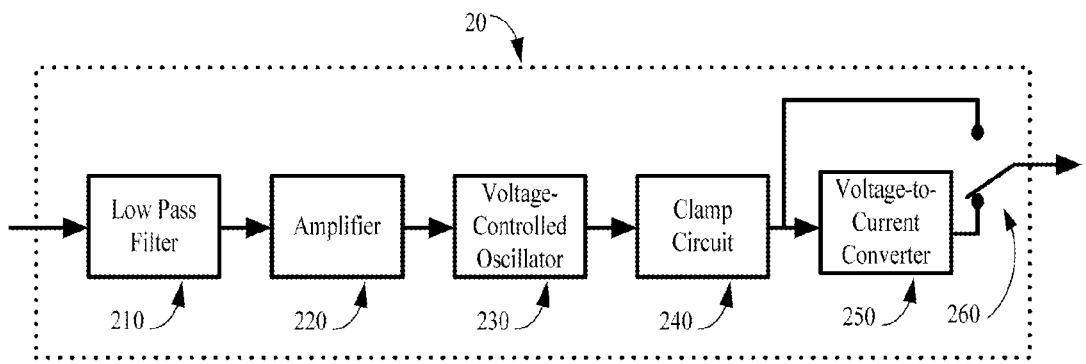
FIG. 7 is a block view showing a controllable sinusoidal wave power of an output voltage/current sinusoidal wave.

In the third preferred embodiment as shown in FIG. 4-A, the controllable sinusoidal wave power alternatively comprises elements shown in FIG. 7 that a low pass filter 210, an amplifier 220, a voltage-controlled oscillator (VCO) 230, a clamp circuit 240, a voltage-to-current converter 250, and a switch 260 are included. When the controllable sinusoidal wave power charges with the sinusoidal wave current, the switch 260 is switched on for connecting to the voltage-to-current converter 250. First, the low pass filter 210 receives the phase contrast signal from the phase comparator 30 and filters out the phase contrast signal for attaining a DC voltage, which is thence transmitted to the amplifier 220 and amplified for being further transmitted to the voltage-controlled oscillator 230. Whereby, the voltage-controlled oscillator 230 changes the output frequency according to the DC voltage. Accordingly, the clamp circuit 240 adjusts the DC level voltage to the voltage-to-current converter 250 for outputting a sinusoidal wave current so as to charge the battery. When the controllable sinusoidal wave power charges with the sinusoidal wave voltage, the switch 260 is switched on for connecting to the clamp circuit 240. First, the low pass filter 210 receives the phase contrast signal from the phase comparator 30 and filters out the phase contrast signal for attaining a DC voltage, which is thence transmitted to the amplifier 220 and amplified for being further transmitted to the voltage-controlled oscillator 230. Whereby, the voltage-controlled oscillator 230 changes the output frequency according to the DC voltage. Accordingly, the clamp circuit 240 adjusts the DC level voltage for outputting a sinusoidal wave voltage so as to charge the battery.

I claim:
1. A device for charging batteries at least comprising a controllable sinusoidal wave power, a small-signal voltage detecting circuit, and a phase comparator; wherein,
   said controllable sinusoidal wave power receiving an output phase contrast signal of said phase comparator for changing an output frequency of said sinusoidal wave power until said output phase contrast signal of said phase comparator equals to zero or a determined value;

said small-signal voltage detecting circuit measuring a charging voltage of said batteries and filtering out a DC part thereof for attaining a small-signal voltage signal, so that said small-signal voltage signal is simultaneously amplified and transmitted to said phase comparator; and said phase comparator receiving a current phase signal from said controllable sinusoidal wave power and a voltage phase signal from said small-signal voltage detecting circuit for comparing a phase contrast therebetween and transmitting a comparing result to said controllable sinusoidal wave power.

2. The device as claimed in claim 1, said controllable sinusoidal wave power at least comprises a voltage-controlled oscillator and a voltage-to-current converter for outputting sinusoidal wave currents of different frequencies.

3. The device as claimed in claim 1, said controllable sinusoidal wave power at least comprises a low pass filter, a voltage-controlled oscillator, an amplifier, a clamp circuit, and a voltage-to-current converter for outputting sinusoidal wave currents of different frequencies and different DC offsets.

4. The device as claimed in claim 1, said small-signal voltage detecting circuit at least comprises a high pass filter and an amplifier.

5. A device for charging batteries comprising a controllable sinusoidal wave power, a small-signal current detecting circuit, and a phase comparator; wherein, said controllable sinusoidal wave power receiving an output phase contrast signal of said phase comparator for changing an output frequency of said sinusoidal wave power until said output phase contrast signal of said phase comparator equals to zero or a determined value;

said small-signal current detecting circuit measuring a charging current of said batteries and filtering out a DC part thereof for attaining a small-signal current signal, so that said small-signal current signal is simultaneously amplified and transmitted to said phase comparator; and said phase comparator receiving a voltage phase signal from said controllable sinusoidal wave power and a current phase signal from said small-signal current detecting circuit for comparing a phase contrast therebetween and transmitting a comparing result to said controllable sinusoidal wave power.

6. The device as claimed in claim 5, said controllable sinusoidal wave power at least comprises a voltage-controlled oscillator for outputting sinusoidal wave voltages of different frequencies.

7. The device as claimed in claim 5, said controllable sinusoidal wave power at least comprises a low pass filter, a voltage-controlled oscillator, an amplifier, and a clamp circuit for outputting sinusoidal wave voltages of different frequencies and different DC offsets.

8. The device as claimed in claim 5, said small-signal current detecting circuit at least comprises a high pass filter and an amplifier.

9. A device for charging batteries at least comprising a controllable sinusoidal wave power, a small-signal current detecting circuit, a small-signal voltage detecting circuit, and a phase comparator; wherein, said controllable sinusoidal wave power receiving an output phase contrast signal of said phase comparator for changing an output frequency of said sinusoidal wave power until said output phase contrast signal of said phase comparator equals to zero or a determined value;

said small-signal current detecting circuit measuring a charging current of said batteries and filtering out a DC part thereof for attaining a small-signal current signal, so that said small-signal current signal is simultaneously amplified and transmitted to said phase comparator;

said small-signal voltage detecting circuit measuring a charging voltage of said batteries and filtering out a DC part thereof for attaining a small-signal voltage signal, so that said small-signal voltage signal is simultaneously amplified and transmitted to said phase comparator; and said phase comparator receiving a voltage phase signal from said small-signal voltage detecting circuit and a current phase signal from said small-signal current detecting circuit for comparing a phase contrast therebetween and simultaneously transmitting a comparing result to said controllable sinusoidal wave power.

10. The device as claimed in claim 9, said controllable sinusoidal wave power at least comprises a voltage-controlled oscillator for outputting sinusoidal wave voltages and currents of different frequencies.

11. The device as claimed in claim 9, said controllable sinusoidal wave power at least comprises a low pass filter, a voltage-controlled oscillator, an amplifier, a clamp circuit, and a voltage-to-current converter for outputting sinusoidal wave voltages and currents of different frequencies and different DC offsets.

12. The device as claimed in claim 9, said small-signal current detecting circuit at least comprises a high pass filter and an amplifier.

13. The device as claimed in claim 9, said small-signal voltage detecting circuit at least comprises a high pass filter and an amplifier.

* * * * *